United States Patent
Schottland et al.

(10) Patent No.: US 10,643,501 B2
(45) Date of Patent: *May 5, 2020

(54) SHRINK WRAP LABEL COATING TO FACILITATE RECYCLING

(71) Applicant: Sun Chemical Corporation, Parsippany, NJ (US)

(72) Inventors: Philippe Schottland, Sparta, NJ (US); Robert Mateuszczyk, Hopelawn, NJ (US); Saverio Lucci, Clifton, NJ (US); Yongping Zha, Berkeley Heights, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/967,818

(22) Filed: May 1, 2018

(65) Prior Publication Data

US 2018/0247570 A1 Aug. 30, 2018

Related U.S. Application Data

(63) Continuation of application No. 15/480,263, filed on Apr. 5, 2017, now Pat. No. 9,990,865, which is a continuation-in-part of application No. 14/911,534, filed as application No. PCT/US2014/048057 on Jul. 24, 2014, now Pat. No. 9,976,057.

(60) Provisional application No. 61/868,261, filed on Aug. 21, 2013.

(51) Int. Cl.
| | | |
|---|---|---|
| B32B 1/02 | (2006.01) | |
| G09F 3/00 | (2006.01) | |
| C09D 167/00 | (2006.01) | |
| C08J 7/04 | (2020.01) | |
| B32B 27/08 | (2006.01) | |
| B32B 27/36 | (2006.01) | |
| B32B 17/10 | (2006.01) | |
| C09J 167/00 | (2006.01) | |
| C08L 67/00 | (2006.01) | |
| G09F 3/02 | (2006.01) | |

(52) U.S. Cl.
CPC ............. *G09F 3/0291* (2013.01); *B32B 1/02* (2013.01); *B32B 17/10779* (2013.01); *B32B 27/08* (2013.01); *B32B 27/36* (2013.01); *C08J 7/047* (2013.01); *C08L 67/00* (2013.01); *C09D 167/00* (2013.01); *C09J 167/00* (2013.01); *B32B 2255/10* (2013.01); *B32B 2255/26* (2013.01); *B32B 2307/736* (2013.01); *B32B 2439/60* (2013.01); *B32B 2519/00* (2013.01); *C08J 2327/06* (2013.01); *C08J 2367/02* (2013.01); *C08J 2467/00* (2013.01); *G09F 2003/0251* (2013.01)

(58) Field of Classification Search
USPC ........................................................ 525/165
See application file for complete search history.

(56) References Cited

U.S. PATENT DOCUMENTS

| | | |
|---|---|---|
| 6,224,974 B1 | 5/2001 | Wuu |
| 8,304,073 B2 | 11/2012 | Davies et al. |
| 8,461,277 B2 | 6/2013 | Dougherty et al. |
| 8,546,472 B2 | 10/2013 | Loos et al. |
| 8,691,394 B2 | 4/2014 | Maruichi et al. |
| 9,005,742 B2 | 4/2015 | Davies et al. |
| 9,387,852 B2 | 7/2016 | Doomheim et al. |
| 2005/0257882 A1 | 11/2005 | Dronzek |
| 2012/0018098 A1 | 1/2012 | Henderson |
| 2013/0145673 A1 | 6/2013 | Babcock, III |
| 2014/0162077 A1 | 6/2014 | Maruichi et al. |
| 2015/0191635 A1 | 9/2015 | Terfloth et al. |
| 2015/0262514 A1 | 9/2015 | Kyogane et al. |
| 2016/0194533 A1 | 7/2016 | Sakakibara et al. |
| 2016/0200942 A1 | 7/2016 | Schottland et al. |
| 2017/0213484 A1 | 7/2017 | Schottland |

FOREIGN PATENT DOCUMENTS

| | | |
|---|---|---|
| CN | 101085899 A | 12/2007 |
| CN | 101735437 B | 6/2010 |
| DE | 102006042074 | 2/2008 |
| EP | 2 162 360 A2 | 3/2010 |
| EP | 2162360 A2 | 3/2010 |
| EP | 2892044 A1 | 7/2015 |

(Continued)

OTHER PUBLICATIONS

Office Action issued in Chinese Counterpart Application 201510977534.4 dated Jan. 17, 2018.
European Search Report issued in European Application No. 14838522.2, dated Jun. 26, 2017.
Supplementary Partial European Search Report issued in European Application No. 14838522.2 dated Mar. 3, 2017.
Chinese Office Action issued in Chinese Application No. 201480046446.6 dated Mar. 1, 2017 (with English Translation).

(Continued)

*Primary Examiner* — Terressa Boykin
(74) *Attorney, Agent, or Firm* — Charles C. Achkar; Ostrolenk Faber LLP

(57) ABSTRACT

The present disclosure relates to a coating composition used to form a bond in the seam area of a label substrate material that wraps around an article and is shrunk in conformance to the size and shape of the article. The coating composition is comprised of at least first and second resins, and in some instances, third resins as described herein. The coating composition provides good bond strength in the seam area of the label, and the coating composition and/or each of the resins thereof may be at least partially hydrolysable but not solutionable in a hot caustic bath, enabling separation of the label from the article during recycling. Further disclosed is a method providing for the separation of labels from the articles, and further disclosed are labeled articles employing the coating compositions.

29 Claims, No Drawings

(56) References Cited

FOREIGN PATENT DOCUMENTS

| | | |
|---|---|---|
| EP | 2956518 A1 | 12/2015 |
| JP | H11-512134 | 10/1999 |
| JP | 2002-091316 A | 3/2002 |
| JP | 2005-28411 A | 10/2005 |
| JP | 2005 289411 A | 10/2005 |
| JP | 2006 293386 A | 10/2006 |
| JP | 2006-293386 A | 10/2006 |
| JP | 2006-308651 A | 11/2006 |
| JP | 2006 308651 A | 11/2006 |
| JP | 2011-118102 A | 6/2011 |
| WO | WO 97/08261 | 3/1997 |
| WO | WO 2007/141115 A2 | 12/2007 |
| WO | WO 2012/161758 | 11/2012 |
| WO | WO-2014-034881 A1 | 3/2014 |
| WO | WO 2015/026479 A1 | 2/2015 |
| WO | WO2016037062 A2 | 3/2016 |
| WO | WO 2016/196267 A1 | 12/2016 |

OTHER PUBLICATIONS

Selke, Susan E. M. Culter, John D.. (2016). Plastics Packaging—Properties, Processing, Applications, and Regulations (3rd Edition)—3.11.2 Glass Transition Temperature. Hanser Publishers. Online version available at: http://app.knovel.com/hotlink/pdf/id:kt0113J5A1/plastics-packaging-properties/glass-transition-temperature.
Related Statement of May 1, 2018.
Chinese Office Action with English summary thereof issued in counterpart Chinese Application No. 201480046446.6 dated Jul. 29, 2019.
Mexican Office Action with English summary thereof issued in counterpart Mexican Application No. MX/a/2016/002157 dated Mar. 28, 2019.
PCT International Preliminary Report on Patentability issued in related PCT/US2018/025668, dated Apr. 8, 2019.
International Search Report issued in International Application No. PCT/US2018/025668, dated Jul. 26, 2018.
Written Opinion of the International Searching Authority issued in International Application No. PCT/US2018/025668, dated Jul. 26, 2018.
VYLON.Amorphous co-polyester (solvent soluble type). Nov. 21, 2014 [online], [retrieved on May 13, 2018]. Retrieved from the internet. <URL:http://www.toyobo-global.com/seihin/xi/vylon_es/vylon_cg.pdf>; p. 1.
Office Action issued in Japanese Counterpart Application 2016-536098 dated Apr. 23, 2018.
Examination Report issued in European Counterpart Application 14 838 522.2 dated Apr. 16, 2018.
Chinese Office Action with English translation thereof issued in counterpart Chinese Application No. 201480046446.6 dated Feb. 3, 2019.
Communication pusuant to Article 94(3) EPC issued in counterpart European Application No. 14 838 522.2 dated Nov. 4, 2019.

SHRINK WRAP LABEL COATING TO FACILITATE RECYCLING

CROSS REFERENCE TO RELATED APPLICATIONS

This application is a continuation of pending U.S. application Ser. No. 15/480,263, filed Apr. 5, 2017, which is a continuation-in-part of pending U.S. application Ser. No. 14/911,534, filed Feb. 11, 2016, which a § 371 National Phase application based on PCT/US2014/048057, filed Jul. 24, 2014, which claims the benefit to U.S. Provisional Application No. 61/868,261, filed Aug. 21, 2013. The contents of these applications are incorporated herein in their entirety.

FIELD OF THE INVENTION

The present invention is in the field of materials and processes to enable the facile recycling of containers such as those constructed of plastic and glass. The present invention provides a coating to apply to labels, including wrap around and sleeve labels, particularly shrink wrap labels, for plastic containers to promote good bonding at the seam, with subsequent ease of recycling. The coatings of the invention are particularly useful for use on labels comprising polyethylene terephthalate (PET), glycol-modified PET (PET-G), polyolefins, cyclic polyolefins (COC) and alpha-polyolefins such as oriented polypropylene (OPP), oriented polystyrene (OPS) and polyethylene (PE), or polyvinyl chloride (PVC). Label substrates may be monolithic or multilayer and comprise one or more polymer layers typically produced via a co-extrusion process. The materials and processes of the invention enable good sealing, resistance to shrinking, and resistance to cold water, of the label applied to the container, while allowing efficient de-seaming and removal of the label during the recycling process.

BACKGROUND

Recycling of plastic containers has become increasingly more popular over the last several years. However, while the plastic containers are recyclable, the materials used to make the shrink wrap labels applied to the containers are often not recyclable. Therefore, it is necessary to remove the shrink wrap label from a plastic container, or separate the label material from the container material, to allow recycling of the plastic container. When the labels are not easily separable from the containers, many containers are not recycled that otherwise would be, and recycling yields are reduced. Thus, there is a need to produce easily separable labels to increase the efficiency of recycling.

The Association of Plastics Recyclers, guidelines from brand owners, and publications of the National Association for PET Container Resources (NAPCOR), are all pointing to the issue created by full body sleeve labels in the recycling system. The sleeves tend to obscure the automated detection systems during the sorting process. As a result, PET recycling facilities have seen decreasing yields as sleeved bottles tend to end up being separated from clear PET containers and discarded.

To alleviate the problems with sorting, recyclers and brand owners tend to recommend paper labels, or partial sleeves made with low density thermoplastic materials, such as polyolefins. However, such materials do not have the desirable shrink properties or printability of higher density substrates such as PET-G.

Moreover, there are currently certain restrictions when applying shrink wrap labels wherein the labels must be sealed at a seam to ensure a strong bond at the seam. For example, it is necessary to avoid printing in the margins of a shrink wrap structure prior to adhering or solvent-welding them together. In addition, it is necessary to clean or wipe the margins of the shrink wrap structure in the area to be seamed prior to adhering or solvent-welding them together.

Shrink sleeve separation from PET containers is typically achieved in the sink/floatation tanks as part of the overall PET recycling process, starting from bales of PET containers and ending with clear recycled PET (R-PET) flakes to be re-used for container making. Several film/resin suppliers, including Exxon, Toppas, and Cryovac, or converters such as Fujiseal, have introduced low density films or co-extruded film structures with low density (below 1.0 or at least below 1.05), to address the shrink sleeve separation issue. Such films are generally based on mono- or multi-layer structures including polymers built around a low density core, such as polyolefins, or micro-voided/cavitated polymer, optionally wrapped by a PET-G skin, and, if needed, a tie layer between the core and the PET-G. The overall density of the film is designed to make it floatable in the sink/floatation tank. However, if the density prior to printing is not low enough, it is possible for the printed sleeve to become too dense, and therefore unable to be separated from the standard PET to be recycled.

PET-G is the preferred material for shrink wrap labels. However, PET-G has a higher density (about 1.3), which hinders separation in the sink/floatation tanks. The density of PET-G may be reduced if voids are created in the extruded film. Incorporation of a blowing agent into a coating offers the advantage that the overall label structure can be significantly reduced in density after activation of the blowing agent by various means, and separated from the container by floatation in a suitable liquid. In principle, this will work both for an entire label, and a ground up mixture of label and container. A coating will show an advantage over an ink for two reasons. First, coating of the entire label means that the blowing agent will be evenly distributed over the label, so that no one area has a higher concentration of blowing agent. Conversely, when the blowing agent is incorporated into the ink printed only in selected areas, those areas will have a higher concentration of blowing agent. Because the blowing agent in a coating is more evenly distributed, it means that a smaller particle size and/or lower coat weight of blowing agent can be used, while still achieving the desired level of density reduction. This, in turn, means that a higher level of transparency, gloss, and slip can be maintained in the overall shrink label structure.

Second, a 100%, even, coating of an entire label will give a consistent level of density reduction between different label designs, compared to an ink which may be printed at a wide range of percentage coverages. This simplifies and standardizes the recycling process.

Additionally, a micro-voided or cavitated film is opaque white, while a foamable coating approach may provide transparency or translucency. Blowing agents that generate a gas on exposure to heat, pH change, photonic radiation and/or thermal energy may comprise any of the types that are well-known to those of skill in the art (see, for example, http://en.wikipedia.org/wiki/Blowing_agent and http://www.eiwa-chem.co.jp/en/product/types.html). Blowing agents may also include metal carbonates and bicarbonates, azides, azodicarbonamide, and diazonium salts.

In addition, it is well known to those of skill in the art that inks can bleed through from their desired location, either into an undesired location on a printed article, or even onto the body parts of someone holding that article (which may be aided by a body fluid such as sweat or saliva). An appropriate coating may alleviate the problem of bleeding.

A coating that is a gas barrier may also be advantageous. Gas barrier coatings are known in the art. However, there are no known coatings that are gas barriers combined with the ability to work as "de-seamable" coatings to improve recycling.

Thus, there is currently no practical or economical solution built around printable materials to address the shrink sleeve issue in the PET recycling process. Manufacturers either must use less-preferred substrates that are less dense than PET-G, or move to more complex, and likely more expensive, floatable film structures. Therefore, there is a need to provide a method to produce labels that have good bond strength at the seams, while still being easily separable from the plastic container during the recycling process.

SUMMARY OF THE INVENTION

The present invention provides novel coatings for labels, including wrap around and sleeve labels, particularly shrink wrap labels, for containers. As used herein, the terms "coating," "coatings," "coating of the invention," or "coatings of the invention" mean liquid compositions that can be deposited on a substrate in various ways, including, but not limited to, printing (such as, but not limited to, analog or digital, inkjet, offset, flexographic, lithographic, gravure, screen printing), roll coating, spray coating, die coating, use of a liquid dosing system such as needle or wick deposition currently done for in-line seaming of shrink sleeve film, and the like. Also provided are methods and processes for application and use of the coatings of the invention. The coatings of the invention promote good bonding at the seam, with subsequent ease of removal for recycling of the containers. The coatings of the invention are useful for coating labels, including wrap around and sleeve labels, particularly shrink wrap labels, to be applied to plastic containers. The coatings of the invention are particularly useful for use on labels comprising PET, PET-G, polyolefins, cyclic polyolefins (COC) and alpha-polyolefins such as OPP and polyethylene (PE), OPS or PVC. Coatings of the invention enable good sealing, resistance to shrinking, and resistance to cold water, of the label applied to the container, while allowing efficient de-seaming and removal of the label during the recycling process.

In one inventive aspect, the present invention is a coating composition comprising:

a) at least one first resin with a glass transition temperature (Tg) or a softening point from 25° C. to 115° C.;

b) at least one second resin having a Tg or a softening point lower than the Tg or softening point of the first resin; and wherein the coating composition is at least partially hydrolysable but not solutionable in a hot caustic bath, and the coating composition, when applied to a label, enables removal of the label during recycling.

In another inventive aspect, the present invention is a coating composition comprising:

a) at least one first resin with a Tg or a softening point from 25° C. to 115° C.;

b) at least one second resin having a Tg or a softening point lower than the Tg or softening point of the first resin; and wherein each of the resins in the coating composition are at least partially hydrolysable but not solutionable in a hot caustic bath, and the coating composition, when applied to a label, enables removal of the label during recycling.

In another inventive aspect, at least one of the first and second resins of the above coating composition is a polyester resin.

In another inventive aspect, at least one of the first and second resins of the above coating composition is a recycled polyester (r-PET) resin.

In another inventive aspect, the difference in the Tg or the softening point between the first and second resins of the above coating composition is 20° C. to 80° C.

In another inventive aspect, the acid value of at least one of two resins in the coating composition is 0 mg KOH/g to <4 mg KOH/g.

In another inventive aspect, the acid value of two resins in the coating composition is 0 mg KOH/g to <4 mg KOH/g.

In another inventive aspect, the acid value of at least one of the first and second resins is 0 mg KOH/g to <4 mg KOH/g.

In another inventive aspect, the acid values of the first and second resins are 0 mg KOH/g to <4 mg KOH/g.

In one inventive aspect, the acid value of at least one resin in the coating composition is 80 mg KOH/g to 200 mg KOH/g.

In another inventive aspect, the acid value of at least one of the first and second resins is 80 mg KOH/g to 200 mg KOH/g.

In another inventive aspect, the coating composition comprises a third resin having a Tg or a softening point lower than the first resin but higher than the second resin.

In another inventive aspect, the coating composition comprises a third resin having an acid value of 0 mg KOH/g to <4 mg KOH/g.

In another inventive aspect, the coating composition comprises a third resin having an acid value higher than the first and second resins.

In another inventive aspect, the coating composition comprises a third resin having an acid value of 80 mg KOH/g to 200 mg KOH/g.

In another inventive aspect, the coating composition comprises a third resin having one or both of a Tg or a softening point lower than the first resin but higher than the second resin and an acid value of 80 mg KOH/g to 200 mg KOH/g.

In another inventive aspect, the coating composition comprises a third resin having one or both of a Tg or a softening point lower than the first and second resins and an acid value of 80 mg KOH/g to 200 mg KOH/g.

In another inventive aspect, the third resin of the coating composition is hydrogenated rosin, for example, hydrogenated rosin selected from partially hydrogenated rosin, fully hydrogenated rosin, and combinations thereof.

In another inventive aspect, the third resin of the coating composition is hydrogenated rosin, for example, hydrogenated rosin selected from partially hydrogenated rosin, fully hydrogenated rosin, and combinations thereof, the hydrogenated rosin having one or both of: a Tg or a softening point lower than the first resin but higher than the second resin; and an acid value of 80 mg KOH/g to 200 mg KOH/g.

In another inventive aspect, the third resin of the coating composition is hydrogenated rosin, for example, hydrogenated rosin selected from partially hydrogenated rosin, fully hydrogenated rosin, and combinations thereof, the hydrogenated rosin having one or both of: a Tg or a softening point lower than the first and second resins; and an acid value of 80 mg KOH/g to 200 mg KOH/g.

In another inventive aspect, the present invention is a method comprising applying a coating composition to a label substrate, wherein:
  a) the label substrate is applied to an article;
  b) the coating enables removal of the label during recycling; and
  c) the coating composition comprises:
    i) at least one first resin with a Tg or a softening point from 25° C. to 115° C.;
    ii) at least one second resin having a Tg or a softening point lower than the Tg or softening point of the first resin; and
  wherein the coating composition is at least partially hydrolysable but not solutionable in a hot caustic bath.

In another inventive aspect, the present invention is a method comprising applying a coating composition to a label substrate, wherein:
  a) the label substrate is applied to an article;
  b) the coating enables removal of the label during recycling; and
  c) the coating composition comprises:
    i) at least one first resin with a Tg or a softening point from 25° C. to 115° C.;
    ii) at least one second resin having a Tg or a softening point lower than the Tg or softening point of the first resin; and
  wherein each of the resins in the coating composition is at least partially hydrolysable but not solutionable in a hot caustic bath.

In another inventive aspect, at least one of the first and second resins of the coating composition applied in the method is a polyester resin.

In another inventive aspect, the difference in the Tg or the softening point between the first and second resins of the coating composition applied in the method is 20° C. to 80° C.

In another inventive aspect, the acid value of at least one resin in the coating composition applied in the method is 0 mg KOH/g to <4 mg KOH/g.

In another inventive aspect, the acid value of two resins in the coating composition applied in the method is 0 mg KOH/g to <4 mg KOH/g.

In another inventive aspect, the acid value of at least one of the first and second resins in the coating composition applied in the method is 0 mg KOH/g to <4 mg KOH/g.

In another inventive aspect, the acid values of the first and second resins in the coating composition applied in the method are 0 mg KOH/g to <4 mg KOH/g.

In one inventive aspect, the acid value of at least one resin in the coating composition applied in the method is 80 mg KOH/g to 200 mg KOH/g.

In another inventive aspect, the acid value of at least one of the first and second resins in the coating composition applied in the method is 80 mg KOH/g to 200 mg KOH/g.

In another inventive aspect, the coating composition applied in the method comprises a third resin having a Tg or a softening point lower than the first resin but higher than the second resin.

In another inventive aspect, the coating composition applied in the method comprises a third resin having a Tg or a softening point lower than the Tg or a softening point of the first and second resins.

In another inventive aspect, the coating composition applied in the method comprises a third resin having an acid value higher than the first and second resins.

In another inventive aspect, the coating composition applied in the method comprises a third resin having an acid value of 0 mg KOH/g to <4 mg KOH/g.

In another inventive aspect, the coating composition applied in the method comprises a third resin having an acid value of 80 mg KOH/g to 200 mg KOH/g.

In another inventive aspect, the coating composition applied in the method comprises a third resin having one or both of a Tg or a softening point lower than the first resin but higher than the second resin and an acid value of 80 mg KOH/g to 200 mg KOH/g.

In another inventive aspect, the coating composition applied in the method comprises a third resin having one or both of a Tg or a softening point lower than the first and second resins and an acid value of 80 mg KOH/g to 200 mg KOH/g.

In another inventive aspect, the third resin of the coating composition applied in the method is hydrogenated rosin, for example, hydrogenated rosin selected from partially hydrogenated rosin, fully hydrogenated rosin, and combinations thereof.

In another inventive aspect, the third resin of the coating composition applied in the method is hydrogenated rosin, for example, hydrogenated rosin selected from partially hydrogenated rosin, fully hydrogenated rosin, and combinations thereof, the hydrogenated rosin having one or both of: a Tg or a softening point lower than the first resin but higher than the second resin; and an acid value of 80 mg KOH/g to 200 mg KOH/g.

In another inventive aspect, the third resin of the coating composition applied in the method is hydrogenated rosin, for example, hydrogenated rosin selected from partially hydrogenated rosin, fully hydrogenated rosin, and combinations thereof, the hydrogenated rosin having one or both of: a Tg or a softening point lower than the first and second resins; and an acid value of 80 mg KOH/g to 200 mg KOH/g.

In another inventive aspect, the present invention is a label substrate coated with a coating composition described above.

In another inventive aspect, the present invention is an article wrapped with a sleeve label applied by the method described above.

In another inventive aspect, the article is a plastic article, which may be rigid or flexible.

In another inventive aspect, the article is a glass article.

In one inventive aspect, the present invention is a coating composition comprising:
  a) at least one first polyester resin;
  b) at least one second polyester resin; and
  c) a third resin.

In another inventive aspect, the above coating composition comprises:
  a) a first polyester resin with a glass transition temperature (Tg) or a softening point from 25° C. to 115° C.; and
  b) a second polyester resin having a Tg or a softening point lower than the Tg or softening point of the first resin; and
  c) a third resin.

In another inventive aspect, the above coating composition is at least partially hydrolysable but not solutionable in a hot caustic bath, and the coating composition, when applied to a label, enables removal of the label during recycling.

In another inventive aspect, each of the resins in the above coating composition are at least partially hydrolysable but not solutionable in a hot caustic bath, and the coating composition, when applied to a label, enables removal of the label during recycling.

In another inventive aspect, the difference in the Tg or the softening point between the first polyester and second polyester resin and/or third resin of the above coating composition is 20° C. to 80° C.

In another inventive aspect, the acid value of the first polyester resin in the above coating composition is 0 mg KOH/g to <4 mg KOH/g.

In another inventive aspect, the acid value of the second polyester resin in the above coating composition is 0 mg KOH/g to <4 mg KOH/g.

In another inventive aspect, the acid value of the first and second polyester resins in the above coating composition is 0 mg KOH/g to <4 mg KOH/g.

In one inventive aspect, the acid value of at least one resin in the above coating composition is 80 mg KOH/g to 200 mg KOH/g.

In another inventive aspect, the acid value of at least one of the first and second resins in the above coating composition is 80 mg KOH/g to 200 mg KOH/g.

In another inventive aspect, the third resin has a Tg or a softening point lower than the first polyester resin but higher than the second polyester resin.

In another inventive aspect, the third resin in the above coating composition has an acid value higher than the first and second polyester resins.

In another inventive aspect, the third resin in the above coating composition has an acid value of 80 mg KOH/g to 200 mg KOH/g.

In another inventive aspect, the third resin in the above coating composition has one or both of a Tg or a softening point lower than the first polyester resin but higher than the second polyester resin and an acid value of 80 mg KOH/g to 200 mg KOH/g.

In another inventive aspect, the third resin in the above coating composition has one or both of a Tg or a softening point lower than the first and second polyester resins and an acid value of 80 mg KOH/g to 200 mg KOH/g.

In another inventive aspect, the third resin in the above coating composition is hydrogenated rosin, for example, hydrogenated rosin selected from partially hydrogenated rosin, fully hydrogenated rosin, and combinations thereof.

In another inventive aspect, the third resin in the above coating composition is hydrogenated rosin, for example, hydrogenated rosin selected from partially hydrogenated rosin, fully hydrogenated rosin, and combinations thereof, the hydrogenated rosin having one or both of: a Tg or a softening point lower than the first polyester resin but higher than the second polyester resin; and an acid value of 80 mg KOH/g to 200 mg KOH/g.

In another inventive aspect, the third resin in the above coating composition is hydrogenated rosin, for example, hydrogenated rosin selected from partially hydrogenated rosin, fully hydrogenated rosin, and combinations thereof, the hydrogenated rosin having one or both of: a Tg or a softening point lower than the first and second polyester resins; and an acid value of 80 mg KOH/g to 200 mg KOH/g.

In another inventive aspect, the hydrogenated rosin is fully hydrogenated rosin.

In another inventive aspect, the present invention is a method comprising applying a coating composition to a label substrate, wherein:

a) the label substrate is applied to an article;
b) the coating enables removal of the label during recycling; and
c) the coating composition comprises:
   i) a first polyester resin;
   ii) a second polyester resin; and
   iii) a third polyester resin.

In another inventive aspect, the coating composition applied in the above method is at least partially hydrolysable but not solutionable in a hot caustic bath.

In another inventive aspect, each of the resins in the coating composition applied in the above method are at least partially hydrolysable but not solutionable in a hot caustic bath.

In another inventive aspect, the coating composition applied in the above method comprises:
   i) a first polyester resin with a Tg or a softening point from 25° C. to 115° C.;
   ii) a second polyester resin having a Tg or a softening point lower than the Tg or softening point of the first resin; and
   iii) a third resin.

In a more particular inventive aspect, the difference in the Tg or the softening point between the first polyester resin and second polyester resin and/or third resin of the coating composition applied in the method is 20° C. to 80° C.

In another inventive aspect, the acid value of the first polyester resin in the coating composition applied in the method is 0 mg KOH/g to <4 mg KOH/g.

In another inventive aspect, the acid value of the second polyester resin in the coating composition applied in the method is 0 mg KOH/g to <4 mg KOH/g.

In another inventive aspect, the acid value of the first and second polyester resins in the coating composition applied in the method is 0 mg KOH/g to <4 mg KOH/g.

In one inventive aspect, the acid value of the third resin in the coating composition applied in the method is 80 mg KOH/g to 200 mg KOH/g.

In another inventive aspect, the Tg or softening point of the third resin of the coating composition applied in the method is lower than the first polyester resin but higher than the second polyester resin.

In another inventive aspect, the Tg or softening point of the third resin of the coating composition applied in the method is lower than the Tg or softening point of the first and second polyester resins.

In another inventive aspect, the acid value of the third resin of the coating composition applied in the method is higher than the first and second polyester resins.

In another inventive aspect, the acid value of the third resin of the coating composition applied in the method is 80 mg KOH/g to 200 mg KOH/g.

In another inventive aspect, the third resin of the coating composition applied in the method has one or both of a Tg or a softening point lower than the first polyester resin but higher than the second polyester resin and an acid value of 80 mg KOH/g to 200 mg KOH/g.

In another inventive aspect, the third resin of the coating composition applied in the method has one or both of a Tg or a softening point lower than the first and second polyester resins and an acid value of 80 mg KOH/g to 200 mg KOH/g.

In another inventive aspect, the third resin of the coating composition applied in the method is hydrogenated rosin, for example, hydrogenated rosin selected from partially hydrogenated rosin, fully hydrogenated rosin, and combinations thereof.

In another inventive aspect, the third resin of the coating composition applied in the method is hydrogenated rosin, for example, hydrogenated rosin selected from partially hydrogenated rosin, fully hydrogenated rosin, and combinations thereof, the hydrogenated rosin having one or both of: a Tg or a softening point lower than the first polyester resin but higher than the second polyester resin; and an acid value of 80 mg KOH/g to 200 mg KOH/g.

In another inventive aspect, the third resin of the coating composition applied in the method is hydrogenated rosin, for example, hydrogenated rosin selected from partially hydrogenated rosin, fully hydrogenated rosin, and combinations thereof, the hydrogenated rosin having one or both of: a Tg or a softening point lower than the first and second polyester resins; and an acid value of 80 mg KOH/g to 200 mg KOH/g.

In another inventive aspect, the third resin of the coating composition applied in the method is fully hydrogenated rosin.

In another inventive aspect, the present invention is a label substrate coated with a coating composition described above.

In another inventive aspect, the present invention is an article wrapped with a sleeve label applied by the method described above.

In another inventive aspect, described herein is a coating composition comprising at least first and second resins and two or more solvents, wherein one of the solvents is a seam-welding solvent present in the composition in an amount of 0.1 wt % to 20 wt %; more preferably in an amount of 0.1 wt % to 15 wt %; still more preferably in an amount of 0.1 wt % to 10 wt %; and even still more preferably in an amount of 0.1 wt % to 5 wt %; based on the total composition weight.

In another inventive aspect the above coating composition may comprise a third resin, wherein the first, second and/or third resins are as described herein.

In one aspect, the present invention provides a method comprising applying a coating composition to a label substrate wherein:
 a) the label substrate is applied to an article; and
 b) the coating enables removal of the sleeve label during recycling.

In one aspect, the present invention provides novel coating compositions to produce de-seamable labels wherein:
 a) the coating produces a bond strength of coating to substrate in the shrink direction after seaming to the substrate, that is the greater 5 N/in or the tensile strength of the substrate;
 b) the coating produces a bond that is suitable for hot shrinking around a container or article; and
 c) the coating is delaminated when placed into a hot caustic environment.

In certain embodiments, the coating composition produces a bond strength of greater than 9 N/in of coating to substrate in the shrink direction after seaming to substrate.

In another embodiment, the coating composition produces a bond strength of greater than 30 N/in of coating to substrate in the shrink direction after seaming to substrate.

In one aspect, the present invention provides novel coating compositions as described above, comprising:
 a) at least one first resin with a Tg above about 25° C., and preferably above about 50° C.;
 b) at least one second resin hydrolysable or solutionable under the conditions of recycling; and
wherein the first and second resin may be the same or different.

In one embodiment, the coating forms a strong bond with the substrate via either a solvent or heat sealing process.

In one embodiment, the coating itself functions as a seaming material, so that no additional solvent or heat sealing process is necessary, and replaces the traditional seaming solvent.

In another embodiment, the coating compositions comprise at least one resin with a Tg above about 25° C., and preferably above 50° C., selected from the group consisting of polyesters, nitrocelluloses, acrylics, styrenics, shellacs, and polyurethanes.

In certain embodiments, the coating compositions further comprise at least one second resin which is at least partially solutioned or hydrolysed in an aqueous medium at a pH of 12 or greater.

In another embodiment, the second resin is selected from the group consisting of polyhydroxycarboxylic acids, sulfopolyesters, acrylics, polymers containing sulfonamide functionality, and polymers with a hydroxyl level of about 50 or greater.

In one embodiment, the acid value of the coating composition based on dry film is greater than 20.

In a certain aspect, the present invention provides a shrink sleeve label film substrate coated with the coating of the invention.

In one embodiment, the entire shrink sleeve label film substrate is coated with the coating.

In another embodiment, the substrate is partly coated with the coating composition.

In another embodiment, the coating has been applied to the substrate as a pattern to create a partial coverage in the seam area.

In certain embodiments, the shrink sleeve label substrate is coated in at least the seaming area with a coating of the invention.

In certain embodiments, the present invention provides a shrink sleeve label substrate coated in at least the seaming area with two outer layers of coatings of the invention, wherein the combination is a coating system that is at least partially hydrolysable or solutionable under the conditions of recycling, comprising:
 a) a first coating layer in contact with the sleeve film substrate comprising at least one resin with a Tg above 25° C., and preferably above about 50° C.; and
 b) a second coating layer applied over the first coating layer;

In one embodiment, the first coating layer is further in contact with the inks printed on the substrate.

In one embodiment, the second coating layer is further in contact with the inks printed on the substrate.

In another embodiment, both the first coating layer and the second coating layer are further in contact with the inks printed on the substrate.

In one embodiment, the two coating layers provide a coating system that is at least partially hydrolysable or solutionable under the conditions of recycling.

In a certain aspect, the present invention provides an article comprising a sleeve label as described above.

In one aspect, the present invention provides a novel method to produce sleeves for labeling containers that can be removed from the container during a hot caustic wash step in the recycling process.

In another aspect, the present invention provides a novel method to produce sleeves for labeling containers that can be removed from the container during a solvent wash step in the recycling process.

In one embodiment, the method to produce sleeves for labeling containers that can be removed from the container during a hot caustic wash step or solvent wash step in the recycling process, comprises applying a coating of the invention to the sleeve label substrate.

In certain embodiments, the sleeves are removed by de-seaming from the container.

In one aspect, the present invention provides an article wrapped with a sleeve label applied as described above.

In one embodiment, the label separates from the article when the article is placed into a hot caustic wash.

In another embodiment, the label is comprised of a seamed substrate.

In another embodiment, the seamed substrate is a substrate constructed of a material such as plastic or glass.

In certain embodiments, the label separates in less than 20 minutes at 65° C.

In another embodiment, the label separates in less than 10 minutes at 65° C.

In another embodiment, the label separates in less than 15 minutes at 75° C.

In another embodiment, the label separates in less than 10 minute at 85° C.

In certain embodiments, the sleeve label on which a coating of the invention has been applied can be de-seamed with a solvent. Suitable solvents include, but are not limited to, acetates, such as methyl acetate, ethyl acetate, and the like.

In one embodiment, the label is a full wrap label.

In another embodiment, the label is a partial wrap label.

In certain embodiments, the label is a shrink wrap label.

In certain embodiments, a coating composition that is not a hot melt glue or a water soluble adhesive composition is applied to the label.

In certain embodiments, the coating composition comprises the coating composition described above.

In one embodiment, the article is a plastic article or a glass article.

In certain embodiments, the coatings of the invention can be adjusted to have a higher content of solids, to provide coatings suitable for seaming of in-line wrap around labels that are placed and seamed directly onto the containers. In some embodiments, the label film is coated in the target area with a coating of the invention, wrapped around a container, and heat-sealed onto the container. Labels so applied will de-seam from the containers when the containers are placed in a hot caustic bath. By seaming the labels directly onto the containers, an additional shrink step would not be necessary. Compared to containers affixed with a label seamed with hot melt glue, the containers of these embodiments would have higher heat resistance, which is an advantage for hot filling of containers. Compared to wrap around labeled containers seamed with water-based adhesives, the containers seamed according to these embodiments would have improved resistance to a water bath (such as when beverage containers are immersed in cold water for extended periods of time).

DETAILED DESCRIPTION OF THE INVENTION

The present invention provides novel coatings for labels, including wrap around and sleeve labels, particularly shrink wrap labels, for containers. The coatings of the invention promote good bonding at the seam, with subsequent ease of removal for recycling of the containers. The coatings of the invention are useful for coating labels, including wrap around and sleeve labels, particularly shrink wrap labels, to be applied to, for example, containers constructed of a plastic material or glass. The coatings of the invention are particularly useful for use on labels comprising PET, PET-G, polyolefins, cyclic polyolefins (COC) and alpha-polyolefins such as OPP and polyethylene (PE), OPS or PVC. Coatings of the invention enable good sealing, resistance to shrinking, and resistance to cold water, of the label applied to the container, while allowing efficient de-seaming and removal of the label during the recycling process.

The present invention provides a way to easily separate sleeve labels from containers, such as PET bottles and glass bottles, during recycling, without adding special manual or mechanical removal equipment, and while maintaining sufficient bond properties within the sleeve to allow it to perform as a standard sleeve. Moreover, the coatings and methods of the present invention are not substrate limited. That is, the coatings and methods of the invention work with low or high density substrates such as polyolefins or PET-G. Additionally, the coatings of the invention may help protect the ink layers and minimize or eliminate the ink bleeding into the water/caustic used for recycling.

Another optional benefit of the invention is that, contrary to what is currently done to achieve good bonds, the sleeves may now be printed with graphics that include the seaming area. Using the methods currently used in the industry, precisely positioning the unprinted seam with regard to the graphics creates additional challenges for the label converters from printing through splitting and cutting. The coatings of this invention are designed to provide good bonds between the coating and the substrate (such as PET-G) even when there is printing in the seam.

The present invention relates to novel coating compositions for use with labels, including wrap around and sleeve labels, particularly shrink sleeve labels that will allow for an easy separation of the label from the container during recycling, and, in particular, during the hot caustic wash step, or a solvent wash step. The method of separating the label from the container comprises applying a bondable, caustic de-seamable, coating layer of the invention in the seam area.

Although prior art teaches that sleeve labels must be printed such that the seam area remains free of ink or coating to ensure good solvent bondability, the coatings of the invention were developed to provide good bond strength for solvent seamed sleeves. In certain embodiments, the coatings of the invention were developed to themselves function as a seaming material, eliminating the need for the additional step of applying a separate seaming solvent, and replace the traditional seaming solvent, to form the seam of the sleeve label.

Good bonds are defined by the bond strength values measured by pulling perpendicularly to the seam direction (e.g., in the shrink direction) and measuring the force necessary to separate the seam. Typical solvent bonds in shrink sleeve labels have a bond strength of 9.8 N/in to 34 N/in (see for example U.S. Pat. No. 8,114,491 B2 (also US 2008/0197540). The seamed samples are cut into 3/16 inch to 1 inch wide strips, and the ends are held by clamps. An Instron tensiometer is used to measure the force required to break the bond at a pulling speed of 15 cm/min. The results are expressed in N or N/in. In the present case, "good" bonds may be defined as bond strength values greater than 5 N/in, or preferably greater than 9 N/in, or more preferably greater than 30 N/in as measured at room temperature.

Suitable compositions of the invention form a coating layer onto the desired label substrate and provide good bond strength via a solvent or heat seaming process, or to function as a coating and seaming material in one step (without the need for an additional step of applying seaming solvent), replacing the traditional seaming solvent, to form a sleeve.

Coatings of the invention withstand the heat shrinking process, whereby the labels are shrunk to fit snugly around the container, providing a seam with sufficient strength to hold the label around the container. During heat shrinking, heat may be applied through a steam tunnel, an IR tunnel, a convection tunnel, or by direct exposure to hot air. Typical temperature and residence time depends on the material, container shape, desired shrink rate, and the technique used to provide the heat. For example, a steam tunnel used for PET-G sleeves reaches between 70° C. and 95° C., with a residence time typically between 5 and 8 seconds, which is enough to achieve up to 75% shrink rate. There may also be a 15 second dip in 85° C. water post shrinkage for PET-G sleeves. Coatings of the invention are also resistant to cold water.

Coatings of the invention will de-seam when placed in hot caustic environments, such as those used during the whole container washing step that is part of the recycling process. The washing step is generally done at 80° C. to 95° C., with 1% to 3% NaOH.

In certain embodiments, coatings of the invention will de-seam when placed in a solvent wash.

The terms "hot caustic bath" and "hot caustic solution" are defined as a 1.5% by weight NaOH solution at a temperature of 85° C. The terms are used interchangeably herein.

The term "solutionable in a hot caustic bath" is defined as 0.5 grams of solid resin being 80% to 100% by weight soluble in 100 grams of hot caustic solution when immersed therein for 20 minutes.

The terms "solutionable", "solutioned", and "soluble" are used interchangeably herein.

The term "at least partially hydrolysable . . . in a hot caustic bath" is defined as having at least some of the hydrolysable functional groups hydrolyse in a hot caustic bath when immersed therein for 20 minutes. The hydrolysable functional groups include for example OH, —COOH or —SO$_3$H which upon hydrolysation deprotonate and undergo cation exchange, in the presence of a base (e.g., alkaline solution or a caustic solution). For example, H+, in the presence of NaOH, is exchanged for Na+, the M+ metal cation.

At least some or all of the resins used to form the coating compositions may possess low acid values, which is believed to limit to solubility of the resins. For example, in one inventive aspect, the acid value of at least one the resins (e.g., first second, third resins) in the coating composition applied in the method is 0 mg KOH/g to <4 mg KOH/g. In another inventive aspect, the acid value of two resins in the coating composition applied in the method is 0 mg KOH/g to <4 mg KOH/g. In yet another inventive aspect, the acid value of at least one of the first and second resins in the coating composition applied in the method is 0 mg KOH/g to <4 mg KOH/g. In still another inventive aspect, the acid values of the first and second resins in the coating composition applied in the method are 0 mg KOH/g to <4 mg KOH/g.

In one inventive aspect, the present invention is a coating composition comprising:
 a) at least one first resin with a Tg or a softening point from 25° C. to 115° C.;
 b) at least one second resin having a Tg or a softening point lower than the Tg or softening point of the first resin; and
 wherein the coating composition is at least partially hydrolysable but not solutionable in a hot caustic bath, and the coating composition, when applied to a label, enables removal of the label during recycling.

In another inventive aspect, the present invention is a coating composition comprising:
 a) at least one first resin with a Tg or a softening point from 25° C. to 115° C.;
 b) at least one second resin having a Tg or a softening point lower than the Tg or softening point of the first resin; and
 wherein each of the resins in the coating composition are at least partially hydrolysable but not solutionable in a hot caustic bath, and the coating composition, when applied to a label, enables removal of the label during recycling.

In a preferred embodiment, 0 wt % to 80 wt % of the coating composition and/or each of the resins in the coating composition is soluble in a hot caustic bath when immersed therein for 20 minutes. In a more preferred embodiment, 0 wt % to 50 wt % of the coating composition and/or each of the resins in the coating composition are soluble in a hot caustic bath when immersed therein for 20 minutes. In still a more preferred embodiment, 0 wt % to 40 wt % of the coating composition and/or each of the resins in the coating composition are soluble in a hot caustic bath when immersed therein for 20 minutes. In even a still more preferred embodiment, 0 wt % to 25 wt % of the coating composition and/or each of the resins in the coating composition are soluble in a hot caustic bath when immersed therein for 20 minutes. In an even yet still more preferred embodiment, 0 wt % to 10 wt % of the coating composition and/or each of the resins in the coating composition are soluble in a hot caustic bath when immersed therein for 20 minutes.

The limited or lack of solubility of the coating composition and/or each of the resins thereof, (e.g., 0 wt % to 80 wt % soluble; 0 wt % to 50 wt % soluble; 0 wt % to 40 wt % soluble; 0 wt % to 25 wt % soluble; 0 wt % to 10 wt % soluble) is advantageous since it improves the useful life of the NaOH solution baths used to de-seam and separate the labels from the containers. For example, since only relatively small amounts of coating composition dissolves into the NaOH solvent baths, the baths remain cleaner for a longer period of time. As a result, the baths can be used for longer periods of time before being changed. Also, the amount of resin that is discharged to the environment is lessened considerably.

The inventive coating compositions include a first resin having a Tg or softening point from 25° C. to 115° C. and a second resin having a Tg or softening point lower than the Tg or softening point of the first resin. Such compositions exhibit robustness and versatility of the composition. For example, such compositions can have a resin able to withstand the temperatures at which the label substrate is shrunk in conformance to the size and shape of the article. By being able to withstand the shrinking temperatures, the coating composition maintains the integrity of the bond at the seam during shrinkage. Further, such compositions can include a lower Tg resin that softens in hot solutions, e.g., a hot caustic solution or bath. Resin softening under these conditions can weaken the bond at the seam, which can contribute to the opening of the seam under recycling conditions. In a preferred embodiment, the difference in the Tg or softening point temperatures of the first and second resins is 20° C. to 80° C.

In one aspect, at least one of the first and second resins of the coating composition is a polyester resin. It has been found that it may be advantageous to use a polyester resin as the first resin and a different polyester resin as the second resin, since coating compositions containing these resins yield a good combination of bond strength in the seam area and further enable removal of the label substrate in a hot caustic bath. Further, polyester resins may have low acid values, e.g., 0 mg KOH/g to 4 mg KOH/g that may be a desired attribute of the first and second resins. Such polyester resins may contribute low solubility to the compositions, and advantage noted herein.

It may be further advantageous to provide a coating composition containing at least first and second polyester resins, and another resin, such a third resin. Such coating composition combinations exhibit excellent bond strength, pass the seaming test, e.g., hold the bond in the seam after the label substrate is shrunk; and de-seam relatively rapidly in recycling conditions, such as a hot caustic bath or similar conditions, e.g., where the temperature and/or amount of caustic material is varied.

In one particular aspect of the invention, a resin in the coating composition has a relatively high acid value, for example, an acid value of 80 mg KOH/g to 200 mg KOH/g. In another particular aspect, the high acid value resin may be one of the first and second resins. It may also be another resin, such as a third resin present in the coating composition. In a preferred embodiment, the high acid value resin is a hydrogenated rosin. The hydrogenated rosin may be partially hydrogenated or it may be fully hydrogenated.

In a preferred embodiment, the coating compositions include a third resin. Preferably, the third resin of the coating composition is one with a Tg or softening point lower than the first resin but higher than the second resin, or a third resin having a Tg or softening point lower than the first and second resins.

The third resin may be employed to improve the coating composition by contributing to the bond strength of the welded seam area. Also, it may make it easier to remove the label during recycling, e.g., by contributing to the hydrolysis of the coating composition and/or being one of the resins thereof that hydrolyse in a hot caustic bath. For example, the third resin may impart green bond strength to the coating composition. That is, it acts as a tackifier when the seam is formed and the coating has not fully set. The green bond strength provided by the third resin helps to keep the seam intact in the time after it is formed.

In a preferred embodiment, the third resin has an acid value higher than the first and second resins, for example, preferably an acid value of: 80 mg KOH/g to 200 mg KOH/g; still more preferably, 100 mg KOH/g to 190 mg KOH/g; still even more preferably, 140 mg KOH/g to 180 mg KOH/g; and yet still even more preferably, 160 mg KOH/g to 170 mg KOH/g. It is further preferred that the third resin be at least partially hydrolyzable but not solutionable in a hot caustic bath.

A relatively high acid value thermoset resin may be employed as the third resin. Such a thermoset resin may have an acid value in one of the preferred ranges mention above, and be at least partially hydrolyzable but not solutionable in a hot caustic bath.

A hydrogenated rosin material, e.g., a fully- or partially-hydrogenated rosin material, is suited as a resin component of the present coating compositions (e.g., the first, second, or third resin component). A hydrogenated rosin material can provide green bond strength to the composition, can soften in a hot caustic bath, and can be hydrolysable but not solutionable in same. Such materials may be obtained from Eastman Chemical Company, Kingsport Tenn., under the FORAL® trade name, at least some of which are thermosets.

In another inventive aspect, the coating composition described herein itself functions as a seaming material, so that no additional solvent or heat sealing process is necessary. Thus, the coating composition described herein can render the use of a traditional seaming solvent unnecessary. Eliminating the need for using a seaming solvent can be beneficial since seaming solvents may include volatile organic compounds (VOCs), which can be hazardous to health and to the environment. Further, since the step of applying the seaming solvent is eliminated, the process of forming the seam is simplified.

In another inventive aspect, the present invention is a method comprising applying a coating composition to a label substrate, wherein:
  a) the label substrate is applied to an article;
  b) the coating enables removal of the label during recycling; and
  c) the coating composition comprises:
    i) at least one first resin with a Tg or a softening point from 25° C. to 115° C.;
    ii) at least one second resin having a Tg or a softening point lower than the Tg or softening point of the first resin; and
  wherein the coating composition is at least partially hydrolysable but not solutionable in a hot caustic bath.

In another inventive aspect, the present invention is a method comprising applying a coating composition to a label substrate, wherein:
  a) the label substrate is applied to an article;
  b) the coating enables removal of the label during recycling; and
  c) the coating composition comprises:
    i) at least one first resin with a Tg or a softening point from 25° C. to 115° C.;
    ii) at least one second resin having a Tg or a softening point lower than the Tg or softening point of the first resin; and
  wherein each of the resins in the coating composition are at least partially hydrolysable but not solutionable in a hot caustic bath.

The method may employ the coating composition discussed above. The label substrate, which may be a shrink sleeve label, may be applied to the plastic article by conventional means. The coating composition may be applied to the label substrate according to conventional practice in the industry.

An article such as a one constructed of plastic or glass (e.g., a container, the contents of which may be a household cleaning product) may be labeled with a label substrate in which the coating composition is used to form a bond in the seam area of the label. The label, after application to the plastic article, may be shrunk to fit to the size and shape of the article. The bond in the seam formed by the coating composition is sufficiently strong to maintain the integrity of the seam and hold the label in place, preferably for the useful life of the article (e.g., until the contents of the container are used up).

In one inventive aspect, the bond in the seam formed by the coating composition has a bond strength that is the lesser of 5 N/in or the tensile strength of the label substrate.

In another inventive aspect, the bond in the seam formed by the coating composition has a bond strength that is greater than 9 N/in or the tensile strength of the label substrate.

In another inventive aspect, the bond in the seam formed by the coating composition has a bond strength that is greater than 30 N/in or the tensile strength of the label substrate.

During the recycling process that occurs after the container contents are used up, the label substrate may be separated from the article in a hot caustic bath, such as described herein.

While not wishing to be bound by any theory, the de-seaming of a label (e.g., a shrink sleeve label) in the seam area bonded with the present coating composition may take place as a result of the following changes that take place in the coating composition when it is exposed to a recycling environment, such as a hot alkaline solution, e.g., a hot caustic bath. A resin in the coating composition with a Tg lower than the bath temperature will soften in the hot caustic bath, weakening the bond in the seam area. Also, the coating composition and/or each of the resins thereof will undergo at least partial hydrolysis, but not be solubilized, causing the seam to swell, which further weakens the bond (e.g., swelling reduces the density of the coating composition). Further, the heat of the bath causes additional shrinkage of the shrink sleeve label. For example, the force of shrinking eventually overcomes the weakening bond, breaking the seam and opening it, thereby separating the shrink sleeve label from the article. The events that lead to de-seaming may take place simultaneously or in any sequence.

During the removal of the labels from the articles, the articles may be subjected to a crushing force to crush the bottles. The combination of crushing the bottles and immersing the bottles in a hot caustic bath may expedite the separation of the labels from the articles. The crushing machine may be employed before, during or after the articles are subjected to the hot caustic bath.

In another inventive aspect, the present invention is a label substrate coated with a coating composition described above. In one aspect, the label substrate is a shrink sleeve label substrate that wraps around an article such as a container and is then shrunk to fit tightly on the container and in conformance to the shape of the container. The label substrate is coated with the coating compositions described herein at least in the seam region of the label substrate, wherein the ends of the label substrate are brought into overlapping arrangement to form the seam and the seam is then bonded with the coating composition. As indicated, the label substrate may be removed from the plastic article with relative ease in a hot caustic bath as a result of the attributes of the coating composition mentioned above.

In another inventive aspect, the present invention is an article wrapped with a sleeve label applied by the method described above. The article may be constructed of plastic, glass, or other material.

The sleeves used to perform the seaming and forming tests were sized according to common practices for shrink labels in the industry. A typical sleeve for solvent seaming would be slit to provide a total length equal to the largest perimeter of the container plus 7 mm to account for the seaming area and overlap. A 7 mm margin typically provides a wide enough area for a good seam, but also a snug fit around the container at the largest perimeter in order to keep the sleeve in place during the hot shrinking process. Additional margin may be added to account for shrinkage due to thermal processes (such as the drying of the coating) which may induce some additional shrinkage. A larger sleeve may be used around a container to provide a desired effect such as a looser fit after shrinkage.

In one embodiment, the coatings of this invention comprise at least one resin with a Tg above about 25° C., preferably above about 50° C., more preferably above about 65° C., and most preferably above about 80° C., and one resin that is either hydrolysable or solutionable in hot caustic solution. The first and second resin may or may not be the same. Hydrolysable or solutionable resins include resins with an acid value greater than or equal to 4 (and preferably greater than or equal to 15, and more preferably greater than or equal to 25), resins with hydroxyl values greater than 5, and resins which will break down in hot caustic environments, such as polylactic acid. The coatings may be solvent based or water based, or use water/solvent mixtures, such as water/alcohol compositions. Examples of suitable resins, as identified in the examples, include certain polyesters, polyurethanes and also polyvinyl alcohol and blends thereof.

In another embodiment, the de-seaming coatings are a blend of polyester resins comprising a resin with a Tg above about 25° C., preferably above about 50° C., more preferably above about 65° C., and most preferably above about 80° C., and a resin with a Tg below about 35° C. having high acid group functionalities. In yet another embodiment, the de-seaming coating further comprises a polymer which decomposes in hot caustic environments, such as polylactic acid.

De-seaming coatings are generally applied onto the reverse side of the sleeve label substrate (which may be pre-treated with an antistatic coating to prevent dust accumulation during printing and handling). Inks are also generally applied on the reverse side, except when the sleeve substrate is opaque, in which case the inks are surface printed. The coatings will be applied over at least a portion of the seaming area. They may be applied over the entire sleeve or have only a partial coverage. They may be applied as a uniform coating or in the form of a pattern of halftone designed to provide a suitable balance of seaming, shrinking and de-seaming properties. They may be allowed to overlap the inks. In one embodiment, the inks may be printed to the edge of the sleeve and be overprinted with the coating in the seaming area while still allowing suitable seaming, shrinking and de-seaming properties.

Coatings are preferably applied through a printing process, such as gravure or flexographic printing, but other deposition methods, such as roll, spray, die coating, dosing via needle or wicking, or screen printing may be possible by adjusting the coating composition to the rheology required for proper deposition for a particular technique.

Coating weight depends on the deposition technique used but will generally be in the range of 0.5 to 10 g/m$^2$ dry, more preferably between 1 and 6 g/m$^2$, and even more preferably between 1.5 and 4 g/m$^2$.

The coating compositions may optionally contain a colorant, such as a dye, a pigment, a taggant, or a fluorophore, to provide means to visualize the deposition or warn end users about the presence of a special de-seaming coating on the label.

In order to ensure good handling and easy fitting of the sleeves onto containers, the coatings will typically have a coefficient of friction at or below 0.3, preferably between 0.10 and 0.40, and more preferably between 0.15 and 0.35.

In order to achieve the desired printing, seaming, shrinking and de-seaming properties, one or more coating layers may be used. In one embodiment, a first coating layer which is hydrolysable, degradable or soluble in a hot caustic environment, is applied and overprinted with a second coating layer designed to ensure good seaming characteristics for sleeves. Alternatively, the coating layers may be reversed, wherein the first coating layer is designed to ensure good seaming characteristics for sleeves, and the second coating layer is hydrolysable, degradable or soluble in a hot caustic environment. After application of the two coating layers, the sleeve seam may be bonded via a solvent or heat sealing process; or the coating layers/system may additionally function as a seaming material, and replace the traditional seaming solvents.

As illustrated in the examples, the methods of this invention apply not only to PET-G sleeves, but also to other substrates, such as OPP, PVC, or OPS, either as monolithic substrates or multilayer structures, whether they are homogenous in composition or comprise layers of different compositions (such as PETG/OPS/PETG or PETG/OPP/PETG based structures or similar co-extruded structures further comprising tie-layers).

In one embodiment, the de-seaming coating comprises one or more renewable resins. Non-limiting examples of such resins include polylactic acid and/or a coating grade of recycled polyester such as JD2-25.

EXAMPLES

Tables 1 and 2 summarize the key properties and source for the materials used in Examples 1-5. Coating solutions were formulated by adding solvent to the resin, or to the resin varnish if the polymer was already supplied in solution form. For the tests, all samples were reduced to about 50 cps viscosity, as measured using a Brookfield spindle viscometer at approximately 20° C. Polyurethane resins, polyester resins, and nitrocellulose were viscosity adjusted by addition of ethyl acetate. Shellac resin and polyvinyl alcohol (Aquaseal X2281) were viscosity adjusted by adding ethanol. The seams in Examples 1-5 were formed by either a traditional solvent or heat sealing process.

TABLE 1

Polyurethane resin materials used in this invention

| I.D | Solids | Viscosity | Solvents | Tg (° C.) | Acid Value mg KOH/g | Amine Value mg KOH/g | OH Value mg KOH/g | Mw Mn Pd | Building Blocks |
|---|---|---|---|---|---|---|---|---|---|
| 940-1071 | 32.0-35.0% | 300-600 cps | 1:1 (n-propanol:n-propyl acetate) | −36 & 41 | 0 | 3-8 | 0 | 24,000 13,200 1.8 | IPDI 1,4 BD pTHF EDA |
| 940-1133 | 49.0-51.0% | 550-900 cps | 1:1.25 (n-propanol:n-propyl acetate) | 60 | 34-41 | 0 | 0 | 8,600 4,075 2.10 | IPDI DMPA Dimer Diol MP Diol |
| 940-1205 | 52.0-54.0% | 250-450 cps | 30:70 (n-propanol:n-propyl acetate) | 49 | 3.6 | 0 | 277 | 1,986 1,131 1.76 | IPDI TMP 1,4 BD |
| 940-1151 | 33.0-36.0% | 900-1,300 cps | 1:1 (n-propanol:n-propyl acetate) | −22 & 81 | 2.6 | 5-12 | 0 | 24,761 15,194 1.63 | IPDI 1,4 BD pTHF EDA |
| 940-1033 | 29.5-33.0% | 300-800 cps | 1:1 (n-propanol:n-propyl acetate) | 8.5 & 41 | 0 | 3-8 | 0 | 32,400 16,300 2.01 | IPDI TDI 1,4BD pTHF EDA |

IPDI: isophorone diisocyanate
TDI: toluene diisocyanate
1,4-BD: 1,4-butanediol
DMPA: Dimethylol propionic acid
EDA: Ethylene diamine
TMP: Trimethylol propane
MP Diol: 2-methyl-1,3-propanediol

TABLE 2

Other polymers used in the examples

| Resins | Chemistry | Supplier | Tg (° C.) | Mn | OH Value mg KOH/g | Acid Value mg KOH/g | % Solids |
|---|---|---|---|---|---|---|---|
| Vyloecol BE-400 | Polylactic acid | Toyobo (JP) | 50 | 43,000 | 3 | — | 100 |
| 3-V-6 | Nitrocellulose varnish | — | 53 | — | — | — | 38.5 |
| Vylon 200 | Polyester | Toyobo (JP) | 67 | 17,000 | 5 | <2 | 100 |
| Vylon GK-360 | Polyester | Toyobo (JP) | 56 | 16,000 | 7 | 5 | 100 |
| Vylon GK-390 | Polyester | Toyobo (JP) | 17 | — | — | 30 | 100 |

TABLE 2-continued

Other polymers used in the examples

| Resins | Chemistry | Supplier | Tg (° C.) | Mn | OH Value mg KOH/g | Acid Value mg KOH/g | % Solids |
|---|---|---|---|---|---|---|---|
| Vylon GK-800 | Polyester | Totobo (JP) | 50 | 18,000 | 7 | <2 | 100 |
| Aquaseal X2281 | PVOH aq. dispersion | Paramelt (Netherlands) | ~85 | — | — | — | 20 |
| Gantrez ES225 | Monoethyl ester of poly(methyl vinyl ether/ maleic acid) in ethanol | Ashland, Inc. (Covington, KY-USA) | 85-90 | — | — | 275-300 | 50 |
| Mowital B30H | Polyvinylbutyral | Kuraray Europe GmbH (Germany) | 68 | — | 18-21%[(1)] | — | 100 |
| JD2-25 R-PET | Polyester | Sun Chemical (internal sample) | 31.2 | 6,150 | 100 | 36 | 100 |
| Tigerlac 5055 | Shellac resin | Kane Int. Corp (Rye, NY-USA) | 72-77[#] | — | 175-240 | 60-75 | 100 |
| Dynapol L411 | Polyester resin | Evonik | 47 | | 5 | 2 | |
| Foral AX-E | Fully hydrogenated rosin | Eastman | 37 80* | | | 165 | |

Dynapol L411 is an amorphous copolyester (Evonik)
Foral AX-E is a fully hydrogenated rosin (Eastman Chemical)
% hydroxyl expressed as the wt % of polyvinyl alcohol in material
[#]melting point (Tm).
*softening point (determined by Hercules drop method)

Coatings were applied to the reverse (print) side of the substrates with a #2 K Bar using a K-Coater (from RK Printcoat Instruments Ltd., Royston—United Kingdom) unless otherwise specified.

Films were then seamed with solvent so that the coated side faced the uncoated side (front side of the substrate). Suitable solvents include, but are not limited to, those sold for the purpose by Flexcraft Industries, Inc. of Newark, N.J., USA, such as Flexcraft 12-103 OB, a solvent blend comprising tetrahydrofuran (THF) as a major component. The seaming solvent composition may be optimized to provide the best seam strength given a specific substrate while meeting industrial application requirements in terms of evaporation speed, flash point, stability and toxicity. For seaming films composed of PET-G, solvent blends comprising THF are commonly used, but other solvents may be employed advantageously in conjunction with other shrink wrap substrates.

The solvent was applied using a solvent pen (felt tip) in combination with a manual seaming machine made by Ryback & Ryback (Monroe, N.C., USA). This formed a sleeve label which was then placed around a blank bottle and shrunk with the heat produced either by a hot air gun, via immersion in hot water (95° C.) bath, or by using a steam pot, for 5 to 10 seconds, depending on the technique. Sleeves were generally allowed to rest overnight in order to ensure that the solvent had fully evaporated before shrink tests.

For the above test, the PET bottle container used had an outer diameter of about 2.8 inches and a circumference of about 9 inches. The seam area on the sleeve label had a length of 6 inches and the sleeve was seamed to provide a snug fit around the bottle with a seamed sleeve perimeter of about 9.25" leaving about 7 mm for the seam area and ink overlap.

The labels were then checked after shrinking to see if the seam stayed intact (i.e., passed the test) or came apart (failed). The seamed bottles that passed were then placed into plain hot water at 85° C. for 15 seconds to assess the sensitivity of the seal to potential overexposure in the steam tunnel.

Finally, the sleeved bottles that had passed all the other tests were placed into a water bath containing 2% aq. NaOH at 85° C. to simulate the recycling "bottle wash" conditions and timed to determine how long it would take for the seam to come apart.

Bond strength of the seamed area in the shrink direction was determined by making a solvent seam between the coated side of the film and the uncoated side using 1-inch wide samples. The ends of the print were then placed into an Instron Tensiometer (model number 3342 made by Instron in Norwood, Mass.—USA) and pulled in a direction perpendicular to the seam direction at a speed of 15 cm/min.

Example 1

Coatings based on different resin compositions and their blends were applied to a freshly corona treated shrink grade PET-G film substrate (Eastman Embrace film/50-micron thick) and tested for seaming performance. Samples that passed the seaming tests were then evaluated for shrink performance around a bottle container, and then, if applicable, de-seaming performance and hot non-caustic bath resistance test as described above. The solvent used for the seaming experiments was a custom mixture of Flexcraft 12-103 OB, a solvent blend available from Flexcraft Industries, Inc., and comprising 1,3-dioxolane, tetrahydrofuran, a higher Tg polymer (polyester, acrylic, styrenic, nitroceland xylenes, blended with additional tetrahydrofuran (in a ratio of 85:15). The results are shown in Table 3.

TABLE 3

Results of seaming, shrink and de-seaming experiments with various compositions

| Resin in Coating Sample | Label Substrate | Bond Strength (N/inch) | Seaming Solvent | Shrink test around container | De-seaming (hot caustic bath) | Hot Water Bath resistance test |
|---|---|---|---|---|---|---|
| 940-1133 | PET-G | 5 | 85% 12-103OB:15% THF | Seam Separated | — | — |
| 940-1205 | PET-G | 5 | 85% 12-103OB:15% THF | Seam Separated | — | — |
| Tigerlac 5055 | PET-G | 0.5 | 85% 12-103OB:15% THF | Seam Separated | — | — |
| JD2-25 R-PET | PET-G | 7 | 85% 12-103OB:15% THF | Seam Separated | — | — |
| Vyloecol BE400 | PET-G | 5 | 85% 12-103OB:15% THF | Seam Separated | — | — |
| Vylon 880 | PET-G | 12 | 85% 12-103OB:15% THF | Seam Separated | — | — |
| Vylon 390 | PET-G | 8 | 85% 12-103OB:15% THF | Seam Separated | — | — |
| Vylon 360 | PET-G | 6 | 85% 12-103OB:15% THF | Seam Separated | — | — |
| 940-1133/940-1205 (1:1 blend) | PET-G | 6 | 85% 12-103OB:15% THF | Seam Separated | — | — |
| 3-V-6 (NC) | PET-G | 7 | 85% 12-103OB:15% THF | Seam Separated | — | — |
| 940-1133/3-V-6 (1:1 blend) | PET-G | 8 | 85% 12-103OB:15% THF | Seam Separated | — | — |
| JD2-25/Vyloecol BE400 | PET-G | 10 | 85% 12-103OB:15% THF | Seam Separated | — | — |
| JD2-25/940-1133 (1:1 blend) | PET-G | 49 | 85% 12-103OB:15% THF | Seam Intact | Deseamed <10 secs | Seam Intact |
| 940-1133/JD-225 (1:1 blend) | PET-G | 42 | 85% 12-103OB:15% THF | Seam Separated | N/A | N/A |
| Vylon 360/Vylon 390 (blend 1:1) | PET-G | 50 | 85% 12-103OB:15% THF | Seam Intact | Deseamed <10 secs | Seam Intact |
| Vylon 390/Vylon 880 (1:1 blend) | PET-G | 48 | 85% 12-103OB:15% THF | Seam Intact | Deseamed <10 secs | Seam Intact |
| Mowitol B30H | PET-G | 6 | 85% 12-103OB:15% THF | Seam Separated | N/A | N/A |
| 940-1071 | PET-G | 9 | 85% 12-103OB:15% THF | Seam Separated | N/A | N/A |
| 940-1151 | PET-G | 7 | 85% 12-103OB:15% THF | Seam Separated | N/A | N/A |
| Gantrez ES-225 | PET-G | 4 | 85% 12-103OB:15% THF | Seam Separated | N/A | N/A |
| Aquaseal X2281 | PET-G | 45 | 85% 12-103OB:15% THF | Seam Intact | Deseamed <10 secs | Seam Intact |

Note:
Bond strengths were measured with Instron Tensiometer model 3342 using 1 inch-wide (2.54 cm) samples and a speed of 15 cm/min.

12-1030B is THF-based solvent blend made by Flexcraft Industries, Inc. (Newark, N.J.—USA) which is commonly used for seaming PET-G sleeves.

For the selected combination of film substrate and seaming solvents, only a few coating compositions provided seams with the desirable combination of properties, which include high Instron bond strength values, and remained intact after the shrink test, but also delaminated in a hot caustic bath. Polyester coating compositions appeared to provide the best performance in the test, either alone, or as a blend with a polyurethane resin. In particular, the blend of lulosic or polyurethane), and lower Tg polyester with a higher acid value seemed the most effective for solvent-based coating compositions. The improved performance of polyester blends compared with single resins is not completely unexpected as combinations of high and low Tg polymers usually provide better film formation and general coating properties.

Additional examples not reported in Table 3, wherein polylactic acid (VyloEcol BE-400 from Toyobo JP) was added as a minor component up to 20 wt % to polyester compositions, providing good bond strength such as 1:1 mixtures of Vylon 360 and 390 or Vylon 390 and 880, also resulted in compositions having the desired properties for the de-seamable coatings. The introduction of additional material hydrolysable under the conditions of recycling, usually comprising treatment with an aqueous medium of pH 12 or greater, such as polylactic acid, appeared to help accelerate de-seaming in the hot caustic bath, and also reduce the coefficient of friction from about 0.30 (static) and 0.26 (kinetic) to 0.21 (static) and 0.19 (kinetic). Other polyhydroxycarboxylic acids, such as polymers derived from caprolactone, are also of benefit, as are polymers with a hydroxyl value of 50 or greater, such as polyvinyl alcohols, starches and cellulosics, sulfopolyesters, acrylics, and polymers containing sulfonamide functionality. Note that a coefficient of friction (CoF) of 0.3 or less is desirable for shrink sleeves to provide suitable performance on shrink labeling production equipment. The CoF was measured with an instrument from Testing Machines, Inc., of New Castle, Del. 19720, USA, model number 32-06-02, equipped with a 200 gram weight and of weight dimensions: 2½ in by 2⅕ in, at a speed setting of 6. The results in Table 3 also show that the water based polyvinyl alcohol composition tested (which comprised at print viscosity 11 wt % solids, 46 wt % water and 43 wt % alcohol), and which was applied with a #2 K-bar, provided suitable properties for the de-seaming coatings.

In summary, Example 1 shows that de-seaming coatings may be formulated as either solvent-based or water-based compositions, and emphasizes the need to have at least one resin with a Tg of over 50° C., and a hydrolysable or high acid value resin.

Example 2

Additional experiments were carried out with different substrates (PET-G, OPP and PVC) using pure Flexcraft 12-103 OB as the seaming solvent. Interestingly, some compositions, such as a polyurethane system, provided better performance on OPP and PVC than on PET-G. Also, the water-based coating made from polyvinyl alcohol, which exhibited excellent results on PET-G, did not perform well on OPP and PVC. The results are shown in Table 4.

resin systems for adhesion as well as seaming characteristics. Any structure based on these materials either as monolayers or multilayers, homogenous or heterogenous, may be a candidate to create de-seamable sleeves via selection of an optimized coating composition to be applied at least in the seaming area.

Example 3

A coating based on a combination of polyester resin (Vylon 360/Vylon 390) at a ratio of 9:1 was tested for performance on printed and unprinted PET-G shrink sleeves. The coating, adjusted to a viscosity of about 50 cps, was applied with a #2 K-bar. Seaming was performed with Flexcraft 12-103 OB solvent. On both substrates, the coating provided acceptable seaming and shrinking performance, and was able to de-seam in less than 4 minutes when placed in a hot caustic bath.

Similar experiments were performed with a combination of polyester resin (Vylon 360/Vylon 880) at a ratio of 1:1 applied with a #2 K-bar on top of printed and unprinted PET-G sleeves. Seaming was performed with Flexcraft 12-103 OB solvent. On both substrates, the coating provided acceptable seaming and shrinking performance and was able to de-seam in less than 4 minutes when placed in a hot caustic bath.

Example 4

PET-G shrink label film samples, some of which were printed with inks, were coated with a first hydrolysable coating comprising a primary resin with a Tg above 50° C. A second coating, selected for its solvent seaming characteristics to the substrate (such as a polyester), was applied on top of the first coating. The combination of the two coatings produced good solvent seaming characteristics and fast de-seaming in the hot caustic bath during the recycling wash step.

Example 5

Using a structure similar to example 4, a first hydrolysable coating was applied onto the substrate followed by a second

TABLE 4

Results of seaming, shrink and de-seaming experiments with various compositions

| Substrate | Coating | Bond Strength (N/inch) | Seaming Solvent | Shrink Test | Hot Water Bath | De-seaming (hot caustic) |
|---|---|---|---|---|---|---|
| OPP | 940-1133 | 41 | 12-103 OB | Seam Intact | Seam Intact | <30 seconds |
| PVC | 940-1133 | 50 | 12-103 OB | Seam Intact | Seam Intact | <30 seconds |
| PVC | Vylon 360/Vylon 390 | 39 | 12-103 OB | Seam Intact | Seam Intact | <30 seconds |
| PET-G | 940-1133 | 1 | 12-103 OB | Poor Seam/separated | N/A | N/A |
| OPP | Aquaseal | 1.4 | 12-103 OB | Seam separated | N/A | N/A |
| PVC | Aquaseal | 10 | 12-103 OB | Seam separated | N/A | N/A |
| PVC | Aquaseal | 1 | 12-103 OB | Seam separated | N/A | N/A |
| PET-G | Aquaseal | 50 | 12-103 OB | Seam Intact | Seam Intact | <30 seconds |
| PET-G | None (control) | 50 | 12-103 OB | Seam Intact | Seam Intact | >10 minutes |

These results show that the de-seamable coating concept can be applied to other shrink label substrates besides PET-G, such as OPP and PVC, with the proper selection of coating selected for its heat sealing properties. The sleeve was then formed using a heat sealing process to form the seam (solvent-less process) and then shrunk around the container/article. The combination of the two coatings produced good heat seaming characteristics and fast de-seaming in a hot caustic bath during the recycling wash step.

Examples 6-9

Inventive coatings were made wherein the coating additionally functioned as a seaming material, replacing traditional seaming solvents, and eliminating the need for an additional step of solvent or heat sealing. The coatings of Examples 6-9 provided strong bonds, and were easily de-seamable during a hot caustic wash step. Table 4 lists material characteristics of representative components used in Examples 6-9. Table 5 shows non-limiting examples of coating solutions which would replace the traditional seaming solvent.

In general, test methods followed standard ASTM procedures wherever possible. Because of the small size of some of the samples, or equipment limitations, however, some minor modifications to the ASTM procedures were required.

The solids content of the coating solutions was determined by weight difference before, and after evaporating solvent by heating a 10 g sample at 150° C. for 30 min.

Viscosity was measured by a Brookfield DV-E viscometer with spindle LV-1(61) at 60 rpm, and approximately 20° C. The viscosity of the coating solutions were adjusted to about 25 to about 50 cps.

"T-peel" bond strength of the seam was measured along the direction of seaming using Instron Model 3342 single column universal testing system, with a load of 50 N and crosshead speed of 300 mm/min, following ASTM Method D1876. The average peeling load at average value (integral) was determined from the autographic curve between the first and last peaks. The "T-peel" bond strength is the average peeling load in gram-force per in (or Newton per inch) of the seam width required to separate the adhered sleeves.

Break strength of the seam in the shrink direction, (perpendicular to seaming) was measured by the same general method as "T-peel" bond strength. Break strength is the maximum peeling load in gram-force per inch (or Newton per inch) of the seam width, and is the load required to separate the adhered sleeves.

Shrink test was performed by immersing a blank bottle wrapped with a seamed shrink sleeve into a Ryback and Ryback S3 steam machine for 5-10 seconds, depending on the technique. It is considered a pass if the sleeve shrinks snuggly around the bottle and the seam stays intact coming out from the steam pot.

De-seaming was measured by immersing the sleeved bottle into a water bath containing a caustic solution at a temperature which is aimed at simulating the conditions of a full bottle (pre) wash process used in typical wet grinding PET recycling. Unless specified otherwise, the conditions of the bath were 1 wt % NaOH at 65° C. The de-seaming time was the time measured between the immersion of the bottle into the caustic until the sleeve label fully separated from the bottle.

TABLE 4

Resin Components used in Examples 6-8:

| | Mn ($\times 10^3$) | Mw ($\times 10^3$) | Tg (° C.) | Ring & Ball Softening Point (° C.) | Acid Value (KOH mg/g) | Hydroxyl Value (KOH mg/g) |
|---|---|---|---|---|---|---|
| Vylon GK880 | 18 | N/A | 84 | N/A | <4 | 5 |
| SMA 2625 | 3.6 | 9.0 | 110 | N/A | 220 | N/A |
| r-PET JD-2-25 | 1.4 | 6.2 | 31 | N/A | 36 | 100 |
| Foralyn 90 | N/A | N/A | 90 | 82 | 8 | N/A |

Vylon GK880 is amorphous copolyester (Tyobo)
SMA2625 is a partially esterified styrene maleic anhydride copolymer (Cray Valley)
r-PET JD-2-25 is a proprietary recycled PET (Sun Chemical)
Foralyn 90 is an ester of hydrogenated rosin (Eastman Chemical)

TABLE 4A

Resin Components used in Example 9:

| | Tg (° C.) | Acid Value (KOH mg/g) |
|---|---|---|
| Polyester A | 75-90 | 0-<4 |
| Polyester B | 40-50 | 0-<4 |
| Hydrogenated Rosin | 30-<40 | 160-170 |

Examples 6-9 were used to form a continuous, adhesively bonded seam at the overlapped longitudinal edge portions of PET-G shrink sleeves. Seaming was performed by a Stanford AccraSeam™ shrink sleeve seamer. The line speed was 300 m/min. The DSS volume set point was 36 ml/min for Examples 6 and 7, and 20 ml/min for Examples 8 and 9. The width of the seam was about 3-3.5 mm. All tests on seamed shrink sleeves were taken at least 3 hours after seaming. The properties of Examples 6-9, and shrink sleeves seamed by them, are summarized in Table 6.

TABLE 5

Coating solutions Examples 6-8:

| | Example 6 | Example 7 | Example 8 |
|---|---|---|---|
| Vylon GK880 | 18 | 16.5 | 18 |
| SMA 2625 | 3 | 4.5 | 3 |
| Dynapol L411 | | | |
| r-PET JD-2-25 | 3 | 3 | 3 |
| Foralyn 90 | 3 | 3 | 3 |
| Foral AX-E | | | |
| SAIB-90EA | | 1 | 1 |
| Ethyl Acetate (EtOAc) | 42 | 41 | 20 |
| Methyl Acetate (MeOAc) | 21 | 21 | |
| Toluene | | | |

TABLE 5-continued

Coating solutions Examples 6-8:

|  | Example 6 | Example 7 | Example 8 |
|---|---|---|---|
| THF | 10 |  | 5 |
| 1,3-dioxolane |  | 10 |  |
| Acetone |  |  | 47 |
| Total | 100 | 100 | 100 |

SAIB-90EA is a plasticizer solution comprising 90% sucrose acetate isobutyrate and 10% ethyl acetate (Eastman Chemical), having a melting point (Tm) of −83° C.

TABLE 5A

Coating solutions Example 9:

|  | Example 9 |
|---|---|
| Polyester A | 3.99 |
| Polyester B | 10.71 |
| Hydrogenated Rosin | 8.10 |
| EtOAc | 10.80 |
| MeOAc | 45.60 |
| Toluene | 10.80 |
| 1,3-dioxolane | 10 |
| Total | 100 |

TABLE 6

Testing of Examples 6-9 coating solutions:

|  | Example 6 | Example 7 | Example 8 | Example 9 |
|---|---|---|---|---|
| Solids content (%) | 29 | 31 | 22 | 22.8 |
| Viscosity (cP) | 32 | 30 | 25 | 9 |
| Acid number of the solution (KOH mg/g) | 9 | 12 | 9 | 14 |
| Acid number of the solids (KOH mg/g) | 32 | 44 | 32 | 60 |
| T-peel strength of seam | 271 gf/in (2.7N/in) | 262 gf/in (2.6N/in) | 152 gf/in (1.5N/in) | 626 gf/in (6.1N/in) |
| Break strength of seam | 21.6 kgf/in (212N/in) | 19.2 kgf/in (188N/in) | 18.3 kgf/in (179N/in) | 20 kgf/in (196N/in) |
| Shrink test | Pass | Pass | Pass | Pass |
| De-seaming time at 65° C. (mm:seconds) | 6:25 | 3:56 | 7:50 | 1:30 |
| De-seaming time at 75° C. (mm:seconds) | 1:57 | 0:35 | 0:49 | N/A |

The inventive coatings can be used to make shrink labels on different kinds of containers, including but not limited to plastics and glass. Example 9 has been successfully utilized to seam PET-G shrink labels on both plastic and glass containers. The resulting labels passed the shrink test 100%. As shown in Table 7, the de-seaming results on plastic and glass containers were very similar.

TABLE 7

De-seaming performance of Example 9 on containers made of different materials

|  | Example 9 | |
|---|---|---|
| Container material | Plastics | Glass |
| De-seaming time[1] (min) | 1:30 | 1:25 |

Examples 6-9 show that coatings of the invention can replace traditional seaming solvents, providing good bond strength, while being easily de-seamable during the recycling process.

The inventive coatings can be used to make shrink labels on different kinds of containers, including but not limited to plastics and glass. Example 9 has been successfully utilized to seam PET-G shrink labels on both plastic and glass containers. The resulting labels passed the shrink test 100%. As shown in Table 7, the de-seaming results on plastic and glass containers were very similar.

Example 9 demonstrates the advantages of a three-resin coating composition in which two of the resins are polyester resins. The composition of Example 9 exhibits very high T-peel strength, very high break strength (e.g., bond strength), passes the seaming test, and de-seams rapidly under recycling conditions.

Example 9 and Examples 6-8 further show that it is advantageous to provide two or more solvents in the coating composition. It is further advantageous that of the two or more solvents in the coating composition, a minimal amount of welding solvent, e.g., seaming solvent (e.g., 1,3-dioxolane, THF) be present. It is believed that the greater the amount of welding solvent in the composition, the slower the de-seaming process takes place. Examples 6-9 use only minimal amounts of welding solvent (e.g., 5 wt %, 10 wt %), and exhibit relatively rapid de-seaming, which is particularly the case with the composition of Example 9.

Examples 11-12

The coatings of Examples 11-12 were applied to PET-G sleeves that were subsequently heat-seamed. The coatings of Examples 11 and 12 provided strong bonds, and were easily de-seamed during a hot caustic wash step. Table 9 lists the compositions of Examples 11-12.

TABLE 9

Compositions of Examples of 11-12

|  | Example 11 | Example 12 |
|---|---|---|
| Vylon 200 |  | 10.5 |
| r-PET JD-2-25 | 27 | 16.5 |
| SAIB-90EA | 1 |  |
| EtOAc | 10 | 41.5 |
| MeOAc | 62 | 31.5 |
| Total | 100 | 100 |

The coatings of Examples 11-12 were applied onto freshly corona-treated shrink grade PET-G film substrates with a #2 K-bar. After fully drying, the coated films were heat seamed using a Uline Impulse Sealer H-190, with a heat setting of 3.5 for 1.5 seconds. Break strength of the seams were measured on 1 inch seamed strips cut from the film by Theller Mini Tensile Tester Model D. The procedures for the shrink and de-seaming tests were the same as described in Examples 6-9. Table 10 shows the test results.

TABLE 10

Properties of coatings of Examples 11-12, and corresponding shrink sleeves

|  | Example 11 | Example 12 |
|---|---|---|
| Solids content (%) | 28 | 27 |
| Dry coat weight (gsm) | 2.2 | 3.0 |
| Acid number of the solution |  |  |

TABLE 10-continued

Properties of coatings of Examples 11-12, and corresponding shrink sleeves

|  | Example 11 | Example 12 |
|---|---|---|
| (KOH mg/g) | 10 | 6 |
| Acid number of the solids (KOH mg/g) | 36 | 22 |
| Break strength of seam | 3.3 kgf/in (33N/in) | 8.3 kgf/in (82N/in) |
| Shrink test | Pass | Pass |
| De-seaming time at 65° C. (mm:seconds) | <2 min | 3:30 min |

Examples 11-12 show that coatings of the invention can be used in heat seam applications, providing good bond strength, while being easily de-seamable during the recycling process. Example 12 is particularly suitable as de-seamable coating due to the presence of a higher Tg resin in the composition.

The solubility of the coating compositions of Examples 6-12 and the resins used therein was determined. 0.5 grams of the resin or coating composition were placed in 100 grams of a hot caustic bath for 20 minutes. All resins except SMA 2625 and SAIB-90EA were found to be less than 50% soluble. The coating compositions of Examples 6-12 were found to be less than 50 wt % soluble.

TABLE 11

Solubility Data

| Resin or Example No. | Initial Weight (g) | Final Weight (g) | Solubility |
|---|---|---|---|
| SMA 2625 | 0.5 | 0.07 | 86% |
| Vylon GK 880 | 0.5 | 0.49 | 2% |
| Vylon GK200 | 0.5 | 0.46 | 8% |
| r-PET JD-2-25 | 0.5 | 0.4 | 20% |
| Foralyn 90 | 0.5 | 0.4 | 20% |
| SAIB-90EA | 0.5 | 0.21 | 58% |
| Polyester A | 0.5 | 0.49 | 2% |
| Polyester B | 0.5 | 0.49 | 2% |
| Hydrogenated Rosin | 0.5 | 0.32 | 36% |
| Example 6 | 0.5 | 0.46 | 8% |
| Example 7 | 0.5 | 0.46 | 8% |
| Example 8 | 0.5 | 0.41 | 18% |
| Example 9 | 0.5 | 0.45 | 10% |
| Example 11 | 0.5 | 0.38 | 24% |
| Example 12 | 0.5 | 0.48 | 4% |

Example 13 (Comparative Example)

A comparative example was made wherein an uncoated PET-G film substrate (Eastman Embrace film/50 microns thick) was heat-seamed, and tested using the same procedures as described for Examples 11-12. The results are shown in Table 12.

TABLE 12

Testing of Comparative Example 13

|  | Example 13 |
|---|---|
| Break strength of seam | 3.0 kgf/in (29N/in) |
| Shrink test | Pass |
| De-seaming time at 65° C. (min:seconds) | Cannot de-seam within 60 min |

Table 11 shows that the uncoated PET-G shrink film was unable to de-seam in the hot caustic condition, although its seam strength was comparable to Examples 10-11. Therefore the coatings of the invention are superior in that they not only provide good bond strength, but also produce heat-seamed sleeves that are easily de-seamable in the hot caustic wash step of the recycling process, allowing for more efficient recycling of PET bottles.

Example 14

The coatings of Examples 6-9 can be adjusted to have a higher content of solids. The adjusted coatings can be applied to in-line wrap around labels that are placed and seamed directly onto the containers. The characteristics of the coatings, and the labels seamed with the coatings, can be tested as described above.

Example 15

The coating of Example 12 can be applied to the target seam area of a label film, and the label wrapped around a container and heat-sealed. The characteristics of the coatings, and the labels seamed with the coatings, can be tested as described above.

Example 16

Three (3) hot caustic solutions were prepared, each having a weight of 100 grams and each containing 1.5 wt % NaOH. A gram of a polyester resin used in the inventive coating compositions having a Tg or softening point between 80° C. and 90° C. and acid value of 0 mg KOH/g to <4 mg KOH/g was added to the first solution. A gram of a polyester resin used in the inventive coating compositions having a Tg or softening point between 40° C. and 50° C. and acid value of 0 mg KOH/g to <4 mg KOH/g was added to the second solution. A gram of a hydrogenated rosin used in the inventive coating compositions having a Tg or softening point between 75° C. and 85° C. and an acid value between 160 mg KOH/g and 170 mg KOH/g was added to the third solution. The solutions were mixed for 20 minutes. Solution temperatures were maintained at 85° C. throughout the test. After drying, the solubility of each individual resin was found to be not solutionable in a hot caustic bath.

Example 17

A coating composition containing the three resins described in Example 16 was formed. The coating composition was dried and 0.5 grams of the dried coating composition was placed into a hot caustic solution as described in Example 16 and mixed for one hour. Solution temperature was maintained at 85° C. throughout the test. After drying, the coating composition sample was found to weigh 0.46 grams; thus about 8% by weight of the coating composition sample was soluble in the hot caustic solution.

Example 18

The coating composition of Example 17 was tested in accordance with Example 3.

TABLE 13

Results of seaming, shrink and de-seaming experiments with the Example 17 Coating Composition:

| Example 17 Coating Composition | Label Substrate | Bond Strength (N/inch) | Shrink test around container | De-seaming (hot caustic bath) | Hot Water Bath resistance test |
|---|---|---|---|---|---|
| As above | e.g., PET-G, maybe others | >100 | Seam Intact | Deseamed <5 min at 75° C. | Seam Intact |

TABLE 14

|  | Example 19 | Example 20 |
|---|---|---|
| Polyester A | 8.6 |  |
| Polyester B |  | 10.65 |
| Hydrogenated Rosin | 11.2 | 12.15 |
| SAIB-90EA | 3 |  |
| Methyl Acetate | 45.6 | 45.6 |
| Ethyl Acetate | 10.8 | 10.8 |
| Toluene | 10.8 | 10.8 |
| 1,3-Dioxolane | 10 | 10 |
| Total | 100 | 100 |

TABLE 15

|  | Example 19 | Example 20 |
|---|---|---|
| Solids content (%) | 22.8 | 22.8 |
| Viscosity (cP) | 9 | 11 |
| Acid number of the solution (KOH mg/g) | 19 | 20 |
| Acid number of the solids (KOH mg/g) | 83 | 89 |
| T-peel strength of seam | 700 gf/in (6.9N/in) | 300 gf/in (2.9N/in) |
| Break strength of seam | 20 kgf/in (196N/in) | 20 kgf/in (196N/in) |
| Shrink test | Pass | Pass |
| De-seaming time at 65° C. (min:seconds) | Cannot de-seam within 10 min | 1:10 |
| De-seaming time at 75° C. (min:seconds) | N/A | N/A |

The compositions of Examples 19-20, described in Tables 14 and 15, contain only two resins: one is a polyester and the other is a hydrogenated rosin. Both compositions have the same solvent system as Example 9, except Example 9 contains three resins in which two of them are polyesters with different Tgs. The Example 19 composition includes the high Tg Polyester A of Example 9. The Example 20 composition includes Polyester B. The compositions of Examples 9 and 19 show similar bond strengths, yet Example 19 has a much longer de-seaming time. On the other hand, the Example 20 composition includes the lower Tg Polyester B of Example 9. The de-seaming time is similar, yet the T-peel strength of the seam of Example 20 is only about half that of Example 9.

The present invention has now been described in detail, including preferred embodiments. However, it will be appreciated that those skilled in the art, upon consideration of the present disclosure, may make modifications and/or improvements that fall within the scope and spirit of the invention.

What is claimed is:

1. A coating composition comprising:
    a) at least one first polyester resin having a Tg or a softening point from 25° C. to 115° C.;
    b) at least one second polyester resin having a Tg or a softening point lower than the Tg or softening point of the first resin; and
    c) a third resin, wherein the third resin is hydrogenated rosin.

2. A method of detaching a label substrate from an article comprising the steps of:
    placing an article having an attached label substrate into a hot caustic solution, the label substrate having a coating composition applied thereto to attach the label substrate to the article;
    detaching the label substrate from the article, wherein the detaching occurs upon exposure of the coating composition to the hot caustic solution, the coating composition comprising:
    a) at least one first resin with a Tg or a softening point from 25° C. to 115° C.;
    b) at least one second resin having a Tg or a softening point lower than the Tg or softening point of the first resin; and
    wherein the coating composition and/or each of the resins in the coating composition are at least partially hydrolysable but not solutionable in a hot caustic bath, and the coating composition, when applied to a label, enables removal of the label during recycling.

3. The method of claim 2, wherein at least one of the first and second resins in the coating composition is a polyester resin.

4. The method of claim 2, wherein the first and second resins in the coating composition are polyester resins.

5. The method of claim 2, wherein the coating composition comprises hydrogenated rosin as a third resin.

6. The method of claim 4, wherein the coating composition comprises hydrogenated rosin as a third resin.

7. The method of claim 2, wherein the label substrate is a shrink sleeve label substrate that has been shrunk to conform to the article.

8. The method of claim 2, wherein the label substrate comprises a seam comprised of the coating composition, and wherein the detaching comprises opening the seam.

9. The method of claim 2, further comprising the step of recycling the article from which the label substrate has been detached.

10. The method of claim 9, wherein at least one of the first and second resins in the coating composition is a polyester resin.

11. The method of claim 9, wherein the first and second resins in the coating composition are polyester resins.

12. The method of claim 9, wherein the coating composition comprises hydrogenated rosin as a third resin.

13. The method of claim 11, wherein the coating composition comprises hydrogenated rosin as a third resin.

14. The method of claim 9, wherein the label substrate is a shrink sleeve label substrate that has been shrunk to conform to the article.

15. The method of claim 9, wherein the label substrate comprises a seam comprised of the coating composition, and wherein the detaching comprises opening the seam.

16. A method of detaching a label substrate from an article, comprising the steps of:

placing an article having an attached label substrate into a hot caustic solution, the label substrate having a coating composition applied thereto to attach the label substrate to the article; and detaching the label substrate from the article, wherein the detaching occurs upon exposure of the coating composition to the hot caustic solution, the coating composition comprising:

a) at least first and second resins; and b) two or more solvents, wherein one of the solvents is a seam-welding solvent present in the composition in an amount, based on the total composition weight, of 0.1 wt % to 20 wt %; preferably in an amount of 0.1 wt % to 15 wt %; more preferably in an amount of 0.1 wt % to 10 wt %; and still more preferably in an amount of 0.1 wt % to 5 wt %.

17. The method of claim 16, wherein the at least one of the first and second resins is a polyester resin.

18. The method of claim 16, wherein the first and second resins are polyester resins.

19. The method of claim 16, wherein the coating composition further comprises hydrogenated rosin as a third resin.

20. The method of claim 18, wherein the coating composition further comprises hydrogenated rosin as a third resin.

21. The method of claim 16, wherein the label substrate is a shrink sleeve label substrate that has been shrunk to conform to the article.

22. The method of claim 16, wherein the label substrate comprises a seam comprised of the coating composition, and wherein the detaching comprises opening the seam.

23. The method of claim 16, further comprising the step of recycling the article from which the label substrate has been detached.

24. The coating composition of claim 23, wherein the at least one of the first and second resins is a polyester resin.

25. The coating composition of claim 23, wherein the first and second resins are polyester resins.

26. The coating composition of claim 23, wherein the coating composition further comprises hydrogenated rosin as a third resin.

27. The coating composition of claim 25, wherein the coating composition further comprises hydrogenated rosin as a third resin.

28. The method of claim 23, wherein the label substrate is a shrink sleeve label substrate that has been shrunk to conform to the article.

29. The method of claim 23, wherein the label substrate comprises a seam comprised of the coating composition, and wherein the detaching comprises opening the seam.

* * * * *